(12) United States Patent
Mauro et al.

(10) Patent No.: US 10,399,890 B2
(45) Date of Patent: Sep. 3, 2019

(54) ALKALI-DOPED AND ALKALI-FREE BOROALUMINOSILICATE GLASS

(71) Applicant: Corning Incorporated, Corning, NY (US)

(72) Inventors: John Christopher Mauro, Corning, NY (US); Adama Tandia, Nelson, PA (US); Kochuparambil Deenamma Vargheese, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/312,965

(22) PCT Filed: May 20, 2015

(86) PCT No.: PCT/US2015/031725
§ 371 (c)(1),
(2) Date: Nov. 21, 2016

(87) PCT Pub. No.: WO2015/179489
PCT Pub. Date: Nov. 26, 2015

(65) Prior Publication Data
US 2017/0190607 A1    Jul. 6, 2017

Related U.S. Application Data

(60) Provisional application No. 62/001,182, filed on May 21, 2014.

(51) Int. Cl.
| | | |
|---|---|---|
| C03C 3/091 | (2006.01) | |
| C03C 3/093 | (2006.01) | |
| C03B 17/02 | (2006.01) | |
| B32B 17/06 | (2006.01) | |
| C03C 17/02 | (2006.01) | |
| C03B 17/06 | (2006.01) | |
| C03C 3/095 | (2006.01) | |
| C03C 3/11 | (2006.01) | |
| C03C 3/118 | (2006.01) | |

(52) U.S. Cl.
CPC ............. *C03C 3/091* (2013.01); *B32B 17/06* (2013.01); *C03B 17/02* (2013.01); *C03B 17/064* (2013.01); *C03C 3/093* (2013.01); *C03C 3/095* (2013.01); *C03C 3/11* (2013.01); *C03C 3/118* (2013.01); *C03C 17/02* (2013.01)

(58) Field of Classification Search
CPC .................................. C03C 3/091; C03C 3/093
See application file for complete search history.

(56) References Cited

U.S. PATENT DOCUMENTS

| | | |
|---|---|---|
| 2002/0151426 A1 | 10/2002 | Murata et al. |
| 2007/0190340 A1 | 8/2007 | Coppola |
| 2009/0143214 A1* | 6/2009 | Niida .................. C03C 3/11 501/56 |
| 2015/0051060 A1 | 2/2015 | Ellison et al. |

FOREIGN PATENT DOCUMENTS

| | | | |
|---|---|---|---|
| DE | 4213679 A1 | 10/1992 | |
| JP | 2001151534 A * | 6/2001 | ............ C03C 3/091 |
| JP | 2001151534 A | 6/2001 | |
| SU | 1527198 A * | 12/1989 | |
| SU | 1527198 A1 | 6/2009 | |
| WO | 1989002877 A1 | 4/1989 | |
| WO | 2013130700 A1 | 9/2013 | |

OTHER PUBLICATIONS

Mauro; "Statistics of Modifier Distributions in Mixed Network Glasses"; The Journal of Chemical Physics, 138, 12A522-1-12A522-8 (2013).
International Search Report of the International Searching Authority; PCT/US2015/031725; dated Aug. 7, 2015; 5 Pages; European Patent Office.
English Translation of English Translation of CN201580038839.7 Office Action dated Nov. 2, 2018; 10 Pages; Chinese Patent Office.

* cited by examiner

*Primary Examiner* — Elizabeth A. Bolden
(74) *Attorney, Agent, or Firm* — Kevin M. Johnson

(57) ABSTRACT

Alkali-doped and alkali-free boroaluminosilicate glasses that include barium oxide and the network formers $SiO_2$, $B_2O_3$, and $Al_2O_3$. The glasses may be doped with up to about 1 mol % of $Li_2O$, $Na_2O$, and/or $K_2O$. The glass may, in some embodiments, have a Young's modulus of less than about 61 GPa and/or a coefficient of thermal expansion, averaged over a temperature range from about 20° C. to about 300° C., of less than about $40 \times 10^{-7}$/° C. These glasses may be used as a cover glass for electronic devices, a color filter substrate, a thin film transistor substrate, or an outer clad layer for a glass laminate.

45 Claims, 1 Drawing Sheet

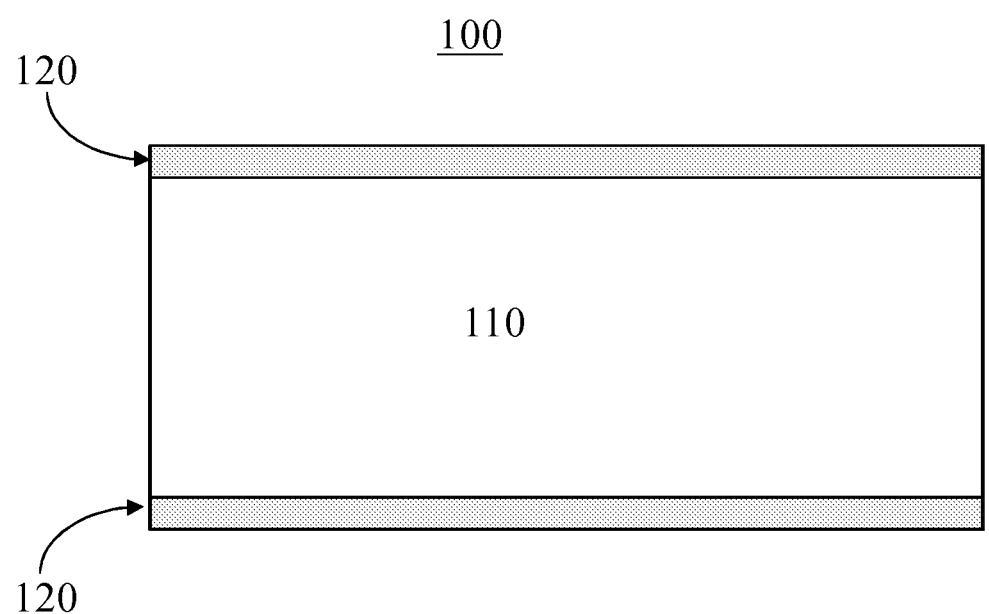

ALKALI-DOPED AND ALKALI-FREE BOROALUMINOSILICATE GLASS

This application claims the benefit of priority under 35 U.S.C. § 119 of U.S. Provisional Application Ser. No. 62/001,182, filed on May 21, 2014, the content of which is relied upon and incorporated herein by reference in its entirety.

BACKGROUND

The disclosure relates to glasses that are doped with alkali metal oxides or are substantially free of such alkali metal oxides. More particularly, the disclosure relates to glasses that are alkali-doped and formable by down-draw processes such as slot-draw and fusion-draw techniques. Even more particularly, the disclosure relates to glasses that are alkali-doped and can be formed into a clad layer for a glass laminate.

SUMMARY

Alkali-doped and alkali-free barium boroaluminosilicate glasses are provided. The glasses include barium oxide (BaO) and the network formers $SiO_2$, $B_2O_3$, and $Al_2O_3$ and may be doped with up to about 1 mol % of $Li_2O$, $Na_2O$, and/or $K_2O$. The glass may, in some embodiments, have a Young's modulus of less than about 61 GPa and/or a coefficient of thermal expansion, averaged over a temperature range from about 20° C. to about 300° C., of less than about $40 \times 10^{-7}/°$ C. These glasses may be used as a cover glass for electronic devices, a color filter substrate, a thin film transistor substrate, or an outer clad layer for a glass laminate.

Accordingly, one aspect of the disclosure is to provide a glass comprising $SiO_2$, $Al_2O_3$, at least 18 mol % $B_2O_3$, from about 1 mol % to about 8 mol % BaO, and up to about 1 mol % of alkali metal oxide modifiers. The glass has a density of about 2.35 $g/cm^3$ to about 2.43 $g/cm^3$ and a Young's modulus of less than about 61 GPa.

A second aspect of the disclosure is to provide a glass comprising: from about 64 mol % to about 70 mol % $SiO_2$; from about 4 mol % to about 10 mol % $Al_2O_3$; from about 18 mol % to about 35 mol % $B_2O_3$; from about 1 mol % to about 8 mol % BaO; and up to about 1 mol % of alkali metal oxide modifiers selected from the group consisting of $Li_2O$, $Na_2O$, and $K_2O$. The glass has a density of about 2.35 $g/cm^3$ to about 2.43 $g/cm^3$ and a Young's modulus of less than about 61 GPa.

A third aspect of the disclosure is to provide a glass laminate comprising a core glass and a clad glass laminated onto an outer surface of the core glass. The clad glass layer comprises: from about 64 mol % to about 70 mol % $SiO_2$; from about 4 mol % to about 10 mol % $Al_2O_3$; from about 18 mol % to about 35 mol % $B_2O_3$; from about 1 mol % to about 8 mol % BaO; and up to about 1 mol % of alkali metal oxide modifiers selected from the group consisting of $Li_2O$, $Na_2O$, and $K_2O$. The clad glass has a density of about 2.35 $g/cm^3$ to about 2.43 $g/cm^3$ and a Young's modulus of less than about 61 GPa. The clad glass has a first coefficient of thermal expansion of less than about $40 \times 10^{-7}/°$ C. and the core glass has a second coefficient of thermal expansion that is greater than the first coefficient of thermal expansion.

A fourth aspect of the disclosure is to provide a method of making a glass laminate comprising a core glass and a clad glass laminated onto an outer surface of the core glass. The method comprises: fusion-drawing a core glass melt to form the core glass; and down-drawing a clad glass melt to form the clad glass surrounding the core glass. The core glass has a coefficient of thermal expansion that is greater than that of the clad glass. The clad glass comprises: $SiO_2$; $B_2O_3$; $Al_2O_3$; from about 1 mol % to about 8 mol % BaO; and up to about 1 mol % of alkali metal oxide modifiers selected from the group consisting of $Li_2O$, $Na_2O$, and $K_2O$; and has a density of about 2.35 $g/cm^3$ to about 2.43 $g/cm^3$ and a Young's modulus of less than about 61 GPa.

These and other aspects, advantages, and salient features will become apparent from the following detailed description, the accompanying drawings, and the appended claims.

BRIEF DESCRIPTION OF THE DRAWINGS

FIG. 1 is a schematic cross-sectional view of a glass laminate.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all compositions are expressed in terms of mole percent (mol %). Coefficients of thermal expansion (CTE) are expressed in terms of $10^{-7}/°$ C. and represent a value measured over a temperature range from about 20° C. to about 300° C., unless otherwise specified.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of alkali metal oxides," for example, is one in which such oxides are not actively added or batched into the glass, but may be present in very small amounts (e.g., less than 0.1 wt %) as contaminants.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein are glasses and glass articles made therefrom having a density ranging from about 2.35 g/cm³ to about 2.43 g/cm³ and a Young's modulus of less than about 61 GPa. These glasses comprise barium oxide (BaO) and the network formers $SiO_2$, $B_2O_3$, and $Al_2O_3$. The glasses are either intentionally doped with up to about 1 mol % of the alkali metal oxide modifiers $Li_2O$, $Na_2O$, and $K_2O$ (i.e., $Li_2O+Na_2O+K_2O \leq 1$ mol %) or are substantially free of such modifiers. In some embodiments, the glasses have low (i.e., less than about $40 \times 10^{-7}/°$ C.) coefficients of thermal expansion (CTE).

In some embodiments, the glasses described herein are formable by down-draw processes that are known in the art, such as slot-draw and fusion-draw processes. The fusion draw process is an industrial technique that has been used for the large-scale manufacture of thin glass sheets. Compared to other flat glass manufacturing techniques, such as the float or slot draw processes, the fusion draw process yields thin glass sheets with superior flatness and surface quality. As a result, the fusion draw process has become the dominant manufacturing technique for the fabrication of thin glass substrates for liquid crystal displays, as well as for cover glass for personal electronic devices such as notebooks, entertainment devices, tables, laptops, and the like.

The fusion draw process involves the flow of molten glass over a trough known as an "isopipe," which is typically made of zircon or another refractory material. The molten glass overflows the top of the isopipe from both sides, meeting at the bottom of the isopipe to form a single sheet where only the interior of the final sheet has made direct contact with the isopipe. Since neither exposed surface of the final glass sheet has made contact with the isopipe material during the draw process, both outer surfaces of the glass are of pristine quality and do not require subsequent finishing.

In order to be fusion drawable, a glass must have a sufficiently high liquidus viscosity (i.e., the viscosity of a molten glass at the liquidus temperature). In some embodiments, the glasses described herein have a liquidus viscosity of at least about 100 kilopoise (kpoise), in other embodiments, at least about 120 kpoise, and in still other embodiments, these glasses have a liquidus viscosity of at least about 300 kpoise. In those instances in which the alkali-doped glasses described herein is used as a clad layer in a glass laminate and the viscosity behavior of the core glass with respect to temperature is approximately the same as that of the clad glass, the liquidus viscosity of the clad glass may be greater than or equal to about 100 kPoise.

Traditional fusion draw is accomplished using a single isopipe, resulting in a homogeneous glass product. The more complicated laminate fusion process makes use of two isopipes to form a laminated sheet comprising a core glass composition surrounded on either (or both) side by outer clad layers. One of the main advantages of laminate fusion is that when the coefficient of thermal expansion of the clad glass is less than that of the core glass, the CTE difference results in a compressive stress in the outer clad layer. This compressive stress increases the strength of the final glass product without the need for ion exchange treatment. Unlike ion exchange, this strengthening can be achieved without the use of alkali ions in the glass.

Accordingly, in some embodiments, the alkali-doped and alkali-free glasses described herein may be used to form a glass laminate, schematically shown in FIG. 1. Glass laminate 100 comprises a core glass 110 surrounded by a clad glass 120 or "clad layer" formed from the alkali-doped or alkali-free glass described herein. The core glass 110 has a CTE that is greater than that of the alkali-doped and alkali-free glass in the clad layer 120. The core glass may, in some embodiments, be an alkali aluminosilicate glass. In one non-limiting example, the core glass is an alkali aluminosilicate glass having the composition 66.9 mol % $SiO_2$, 10.1 mol % $Al_2O_3$, 0.58 mol % $B_2O_3$, 7.45 mol % $Na_2O$, 8.39 mol % $K_2O$, 5.78 mol % MgO, 0.58 mol % CaO, 0.2 mol % $SnO_2$, 0.01 mol % $ZrO_2$, and 0.01 mol % $Fe_2O_3$, with a strain point of 572° C., an anneal point of 629° C., a softening point of 888° C., and CTE=$95.5 \times 10^{-7}/°$ C.

When employed as a clad glass in a laminated product, the alkali-doped and alkali-free glass compositions described herein can provide high compressive stresses to the clad layer. The CTE of low alkali metal oxide/alkali-doped and alkali-free fusion-formable glasses described herein are generally in the range of about $40 \times 10^{-7}/°$ C. or less and, in some embodiments, in the range of about $38 \times 10^{-7}/°$ C. or less. When such a glass is paired with, for example, an alkali aluminosilicate glass (e.g., Gorilla® Glass, manufactured by Corning Incorporated) having a CTE of $90 \times 10^{-7}/°$ C., the expected compressive stress in the clad glass can be calculated using the elastic stress equations given below in which subscripts 1 and 2 refer to the core glass and the clad glass, respectively:

$$\sigma_2 = \frac{E_1(e_2 - e_1)}{\left(\frac{E_1}{E_2}(1-v_2)\right) + \left(\frac{2t_2}{t_1}(l-v_1)\right)}$$

and $$\sigma_1 = -\frac{2t_2}{t_1}\sigma_2$$

where E is Young's modulus, v is Poisson's ratio, t is the glass thickness, σ is the stress, and $e_2$-$e_1$ is the difference in thermal expansion between the clad glass and the core glass. Using the same elastic modulus and Poisson's ratio for the clad glass and core glass further simplifies the above equations.

To calculate the difference in thermal expansion between the clad glass and core glass, it is assumed that the stress sets in below the strain point of the softer glass of the clad and core. The stresses in the clad glass can be estimated using these assumptions and the equations above.

The alkali-doped and alkali-free glasses described herein have especially low coefficients of thermal expansion. In some embodiments, the CTE of the glass is less than less than about $40 \times 10^{-7}/°$ C. and, in other embodiments, is less than about $38 \times 10^{-7}/°$ C. When paired with a core glass having a higher CTE, the glasses described herein provide a high level of compressive stress in the clad layers of the final laminated glass product. This increases the strength of the glass laminate product. Room-temperature compressive stresses of at least about 50 MPa and, in some embodiments, at least about 100 MPa are attainable by using the glasses disclosed herein in the clad layer of the laminate. When used as a clad layer, the liquidus viscosity requirements of the glasses described herein may be lowered. In those embodiments where the viscosity behavior of the core glass with respect to temperature is approximately the same as (i.e., "matched with") that of the clad glass, the liquidus viscosity of the clad glass may be greater than or equal to about 100 kPoise.

The alkali-doped glasses have Young's modulus and shear modulus values that are significantly less than those of other commercially available fusion-drawn glasses. In some embodiments, the Young's modulus is less than about 61 gigapascals (GPa) and, in still other embodiments, less than about 58 GPa. The low elastic moduli provide these glasses with a high level of intrinsic damage resistance.

In some embodiments, the glasses described herein consist essentially of or comprise: from about 64 mol % to about 70 mol % $SiO_2$ (i.e., 64 mol % ≤ $SiO_2$ ≤ 70 mol %); from about 4 mol % to about 10 mol % $Al_2O_3$ (i.e., 4 mol % ≤ $Al_2O_3$ ≤ 10 mol %); from about 18 mol % to about 35 mol % $B_2O_3$ (i.e., 18 mol % ≤ $B_2O_3$ ≤ 35 mol %); from about 1 mol % to about 8 mol % BaO (i.e., 1 mol % ≤ BaO ≤ 8 mol %); up to about 3 mol % MgO (i.e., 0 mol % ≤ MgO ≤ 3 mol %); up to about 4 mol % CaO (i.e., 0 mol % ≤ CaO ≤ 4 mol %); and up to about 5 mol % SrO (i.e., 0 mol % ≤ SrO ≤ 5 mol %), wherein the sum of the alkali metal oxide modifiers $Li_2O$, $Na_2O$, and $K_2O$ is less than or equal to about 1 mol % (e.g., 0 mol % ≤ $Li_2O$+$Na_2O$+$K_2O$ ≤ 0.1 mol %).

The glass may further include up to about 0.5 mol % $Fe_2O_3$ (i.e., 0 mol % ≤ $Fe_2O_3$ ≤ 0.5 mol %); up to about 0.1 mol % $ZrO_2$ (i.e., 0 mol % ≤ $ZrO_2$ ≤ 0.1 mol %); and, optionally, at least one fining agent such as $SnO_2$, $CeO_2$, $As_2O_3$, $Sb_2O_5$, $Cl^-$, $F^-$, or the like. The at least one fining agent may, in some embodiments, include up to about 0.5 mol % $SnO_2$ (i.e., 0 mol % ≤ $SnO_2$ ≤ 0.5 mol %); up to about 0.5 mol % $CeO_2$ (i.e., 0 mol % ≤ $CeO_2$ ≤ 0.5 mol %); up to about 0.5 mol % $As_2O_3$ (i.e., 0 mol % ≤ $As_2O_3$ ≤ 0.5 mol %); and up to about 0.5 mol % $Sb_2O_3$ (i.e., 0 mol % ≤ $Sb_2O_3$ ≤ 0.5 mol %).

In particular embodiments, the glasses consist essentially of or comprise: from about 65 mol % to about 69 mol % $SiO_2$ (i.e., 65 mol % ≤ $SiO_2$ ≤ 69 mol %); from about 5 mol % to about 8 mol % $Al_2O_3$ (i.e., 5 mol % ≤ $Al_2O_3$ ≤ 8 mol %); from about 19 mol % to about 24 mol % $B_2O_3$ (i.e., 19 mol % ≤ $B_2O_3$ ≤ 24 mol %); from about 2 mol % to about 7 mol % BaO (i.e., 2 mol % ≤ BaO ≤ 7 mol %); up to about 2 mol % MgO (i.e., 0 mol % ≤ MgO ≤ 2 mol %); up to about 3 mol % CaO (i.e., 0 mol % ≤ CaO ≤ 3 mol %); and up to about 4 mol % SrO (i.e., 0 mol % ≤ SrO ≤ 4 mol %), wherein the sum of the alkali metal oxide modifiers $Li_2O$, $Na_2O$, and $K_2O$ is less than or equal to about 0.1 mol % (e.g., 0 mol % ≤ $Li_2O$+$Na_2O$+$K_2O$ ≤ 0.1 mol %).

The glass may further include up to about 0.1 mol % $ZrO_2$ (i.e., 0 mol % ≤ $ZrO_2$ ≤ 0.1 mol %), up to about 0.2 mol % $Fe_2O_3$ (i.e., 0 mol % ≤ $Fe_2O_3$ ≤ 0.2 mol %) and at least one fining agent such as $SnO_2$, $CeO_2$, $As_2O_3$, $Sb_2O_5$, $Cl^-$, $F^-$, or the like. The at least one fining agent may, in some embodiments, include up to about 0.2 mol % $SnO_2$ (i.e., 0 mol % ≤ $SnO_2$ ≤ 0.2 mol %).

Each of the oxide components of these glasses serves a function. Silica ($SiO_2$) is the primary glass forming oxide, and forms the network backbone for the molten glass. Pure $SiO_2$ has a low CTE and is alkali metal-free. Due to its extremely high melting temperature, however, pure $SiO_2$ is incompatible with the fusion draw process. The viscosity curve is also much too high to match with that of any core glass in a laminate structure. In some embodiments, the amount of $SiO_2$ in the glasses described herein ranges from about 64 mol % to about 70 mol %. In other embodiments, the $SiO_2$ concentration ranges from about 66 mol % to about 69 mol %.

In addition to silica, the glasses described herein comprise the network formers $Al_2O_3$ and $B_2O_3$ to achieve stable glass formation, low CTE, low Young's modulus, low shear modulus, and to facilitate melting and forming. By mixing all three of these network formers in appropriate concentrations, it is possible achieve stable bulk glass formation while minimizing the need for network modifiers such as alkali or alkaline earth oxides, which act to increase CTE and modulus. Like $SiO_2$, $Al_2O_3$ contributes to the rigidity to the glass network. Alumina can exist in either fourfold or fivefold coordination within the glass. In some embodiments, the glasses described herein comprise from about 4 mol % to about 10 mol % $Al_2O_3$ and, in particular embodiments, from about 5 mol % to about 8 mol % $Al_2O_3$.

Boron oxide ($B_2O_3$) is also a glass-forming oxide that is used to reduce viscosity and thus improves the ability to melt and form glass. $B_2O_3$ may exist in either threefold or fourfold coordination in the glass network. Threefold coordinated $B_2O_3$ is the most effective oxide for reducing the Young's modulus and shear modulus, thus improving the intrinsic damage resistance of the glass. Accordingly, the glasses described herein, in some embodiments, comprise from about 18 mol % up to about 35 mol % $B_2O_3$ and, in other embodiments, from about 19 mol % to about 24 mol % $B_2O_3$.

Alkaline earth oxides (MgO, CaO, BaO, and SrO), like $B_2O_3$, also improve the melting behavior of the glass. However, they also act to increase CTE and Young's and shear moduli. In some embodiments, the glasses described herein comprise up to about 3 mol % MgO, up to about 4 mol % CaO, and/or up to about 5 mol % SrO and, in other embodiments, up to about 2 mol % MgO, up to about 3 mol % CaO, and/or up to about 4 mol % SrO.

All of the glasses described herein include BaO. The presence of this oxide allows the density of the glasses to be within the range of 2.35 to 2.43 g/cm$^3$, which facilitates transitioning to or from other commercialized glass compositions during manufacturing.

In some embodiments, the glasses described herein are intentionally doped with up to about 1 mol % of alkali metal oxide modifiers (i.e., $Li_2O$+$Na_2O$+$K_2O$ ≤ 1 mol %) to lower the resistivity of the glass melt and avoid "fire-through" of refractory containment and processing structures. In these glasses, the alkali metal oxides are limited to $Li_2O$, $Na_2O$, and/or $K_2O$. In some embodiments, the glasses are doped with up to about 0.1 mol % of the alkali metal oxide modifiers $Li_2O$, $Na_2O$, and $K_2O$ (i.e., $Li_2O$+$Na_2O$+$K_2O$ ≤ 0.1 mol %). In other embodiments, the glasses are free of such alkali metal oxide modifiers.

The glass may also include at least one fining agent such as $SnO_2$, $CeO_2$, $As_2O_3$, $Sb_2O_5$, $Cl^-$, $F^-$, or the like in small concentrations to aid in the elimination of gaseous inclusions during melting. In some embodiments, the glass may comprise up to about 0.5 mol % $SnO_2$, up to about 0.5 mol % $CeO_2$, up to about 0.5 mol % $As_2O_3$, and/or up to about 0.5 mol % $Sb_2O_3$. In other embodiments, the glass may comprise up to about 0.2 mol % $SnO_2$.

A small amount of $ZrO_2$ may also also be introduced by contact of hot glass with zirconia-based refractory materials in the melter, and thus monitoring its level in the glass may be important to judging the rate of tank wear over time. The glass, may in some embodiments, include up to about 0.1 mol % $ZrO_2$. The glass may further comprise low concentrations of $Fe_2O_3$, as this material is a common impurity in batch materials. In some embodiments, the glass may include up to about 0.5 mol % $Fe_2O_3$ and, in other embodiments, up to about 0.2 mol % $Fe_2O_3$.

Compositions and selected physical properties (anneal and softening points, 200 poise temperature $T^{200}$, density, CTE, and Young's modulus E) of non-limiting examples of these glasses are listed in Table 1.

TABLE 1

Exemplary compositions, expressed in mol %, of glasses and associated physical properties. All temperatures (anneal point, strain point, $T^{200}$) listed are expressed in ° C.

| | Sample | | | | |
|---|---|---|---|---|---|
| | 1 | 2 | 3 | 4 | 5 |
| $SiO_2$ | 65 | 67 | 65 | 68 | 67 |
| $Al_2O_3$ | 6 | 8 | 6 | 7 | 7 |
| $B_2O_3$ | 23 | 19 | 23 | 19 | 19 |
| MgO | 0 | 0 | 0 | 1 | 0 |
| CaO | 0 | 1 | 0 | 0 | 0 |
| SrO | 2 | 3 | 1 | 3 | 3 |
| BaO | 4 | 2 | 5 | 2 | 4 |
| Anneal Point | 628.9 | 654.0 | 627.4 | 651.9 | 647.7 |
| Softening Point | 890.0 | 914.8 | 888.8 | 921.2 | 910.9 |
| $T^{200}$ | 1570.6 | 1592.0 | 1571.2 | 1612.2 | 1594.8 |
| Density [g/cm$^3$] | 2.35 | 2.35 | 2.36 | 2.35 | 2.41 |
| CTE [$10^{-7}$/° C.] | 37.39 | 34.15 | 37.58 | 34.06 | 37.31 |
| E [GPa] | 55.7 | 60.48 | 56.19 | 59.7 | 60.44 |

| | Sample | | | | |
|---|---|---|---|---|---|
| | 6 | 7 | 8 | 9 | 10 |
| $SiO_2$ | 67 | 67 | 66 | 66 | 68 |
| $Al_2O_3$ | 7 | 7 | 7 | 7 | 6 |
| $B_2O_3$ | 19 | 19 | 20 | 20 | 19 |
| MgO | 0 | 0 | 1 | 0 | 0 |
| CaO | 1 | 2 | 0 | 1 | 2 |
| SrO | 3 | 1 | 2 | 2 | 0 |
| BaO | 3 | 4 | 4 | 4 | 5 |
| Anneal Point | 648.5 | 643.6 | 641.3 | 641.1 | 638.4 |
| Softening Point | 906.5 | 904.5 | 901.5 | 900.4 | 907.0 |
| $T^{200}$ | 1585.1 | 1583.1 | 1577.5 | 1575.1 | 1600.0 |
| Density [g/cm$^3$] | 2.39 | 2.38 | 2.38 | 2.39 | 2.38 |
| CTE [$10^{-7}$/° C.] | 36.49 | 36.46 | 36.83 | 37.2 | 37.53 |
| E [GPa] | 60.08 | 60.74 | 60.11 | 59.74 | 60.01 |

| | Sample | | | | |
|---|---|---|---|---|---|
| | 11 | 12 | 13 | 14 | 15 |
| $SiO_2$ | 67 | 66 | 67 | 66 | 67 |
| $Al_2O_3$ | 7 | 7 | 6 | 6 | 6 |
| $B_2O_3$ | 19 | 20 | 20 | 21 | 20 |
| MgO | 0 | 0 | 0 | 0 | 0 |
| CaO | 1 | 0 | 0 | 1 | 1 |
| SrO | 2 | 2 | 2 | 2 | 1 |
| BaO | 4 | 5 | 5 | 4 | 5 |
| Anneal Point | 647.2 | 642.9 | 638.5 | 635.6 | 637.1 |
| Softening Point | 905.7 | 903.1 | 906.3 | 895.4 | 902.3 |
| $T^{200}$ | 1585.7 | 1581.9 | 1598.6 | 1575.6 | 1591.2 |
| Density [g/cm$^3$] | 2.39 | 2.41 | 2.41 | 2.38 | 2.39 |
| CTE [$10^{-7}$/° C.] | 36.98 | 37.68 | 38.36 | 37.99 | 38.17 |
| E [GPa] | 60.53 | 60.11 | 58.73 | 57.59 | 58.9 |

| | Sample | | | | |
|---|---|---|---|---|---|
| | 16 | 17 | 18 | 19 | 20 |
| $SiO_2$ | 67 | 68 | 66 | 65 | 69 |
| $Al_2O_3$ | 6 | 6 | 5 | 5 | 6 |
| $B_2O_3$ | 20 | 20 | 22 | 24 | 19 |
| MgO | 1 | 0 | 0 | 0 | 0 |
| CaO | 0 | 0 | 0 | 0 | 0 |
| SrO | 2 | 2 | 0 | 0 | 2 |
| BaO | 4 | 4 | 7 | 6 | 4 |
| Anneal Point | 639.6 | 638.6 | 627.6 | 622.2 | 646.3 |
| Softening Point | 904.6 | 910.4 | 896.7 | 885.9 | 916.8 |
| $T^{200}$ | 1592.6 | 1611.2 | 1593.3 | 1576.6 | 1622.1 |
| Density [g/cm$^3$] | 2.38 | 2.37 | 2.43 | 2.37 | 2.37 |
| CTE [$10^{-7}$/° C.] | 36.96 | 36.65 | 40.11 | 38.83 | 36.38 |
| E [GPa] | 58.73 | 57.99 | 56.65 | 54.34 | 58.77 |

A method of making the glasses described herein is also provided. The method includes providing a glass melt comprising $SiO_2$, $B_2O_3$, $Al_2O_3$, and BaO, wherein the glass melt is doped with or substantially free of the alkali metal oxide modifiers $Na_2O$, $K_2O$, and $Li_2O$, and down-drawing the glass melt to form the glass. In some embodiments, the step of down-drawing the glass comprises slot-drawing the glass melt and, in other embodiments, fusion-drawing the glass melt.

In certain embodiments, the method further includes providing a core glass melt and fusion drawing the core glass melt to form a core glass having a coefficient of thermal expansion that is less than the coefficient of thermal expansion of the clad glass. The clad glass melt is then fusion drawn to form the clad glass layer, thereby surrounding the core glass. The clad glass layer is under a compressive stress of at least about 100 MPa and, in some embodiments, at least about 50 MPa.

Being substantially free of alkali metals, the glasses described herein are suitable for use in thin film transistor (TFT) display applications. These applications require an alkali-doped and alkali-free interface, since the presence of alkali ions poisons the thin film transistors. Thus, ion exchanged alkali-containing glasses are unsuitable for such applications. Glass laminates that employ the alkali-doped and alkali-free glasses described herein as a clad layer provide a strengthened glass product combined with an interface that is either free or doped with a low level (≤1 mol %; in some embodiments, ≤0.1 mol %) alkali metals or alkali metal oxides.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the scope of the present disclosure or appended claims.

The invention claimed is:

1. A glass, the glass comprising from 64 mol % to 70 mol % $SiO_2$, $Al_2O_3$, at least 18 mol % $B_2O_3$, from 1 mol % to 8 mol % BaO, from 0 mol % to 4 mol % CaO, and from 0 mol % to 1 mol % of alkali metal oxide modifiers, wherein the glass has a density of 2.35 g/cm$^3$ to 2.43 g/cm$^3$ and a Young's modulus of less than or equal to 61 GPa.

2. The glass of claim 1, comprising at least one of $Li_2O$, $Na_2O$, and $K_2O$.

3. The glass of claim 1, wherein the glass further comprises at least one fining agent.

4. The glass of claim 3, wherein the at least one fining agent comprises at least one of $SnO_2$, $CeO_2$, $As_2O_3$, $Sb_2O_5$, $Cl^-$, and $F^-$.

5. The glass of claim 1, wherein the glass comprises from 0 mol % to 0.5 mol % $Fe_2O_3$ and from 0 mol % to 0.1 mol % $ZrO_2$.

6. The glass of claim 1, wherein the glass is substantially free of the alkali metal oxide modifiers.

7. The glass of claim 1, wherein the glass comprises: from 64 mol % to 70 mol % $SiO_2$; from 4 mol % to 10 mol % $Al_2O_3$; from 18 mol % to 35 mol % $B_2O_3$; from 0 mol % to 3 mol % MgO; from 0 mol % to 4 mol % CaO; from 0 mol % to 5 mol % SrO; from 1 mol % to 8 mol % BaO; and from 0 mol % to 1 mol % of alkali metal oxide modifiers.

8. The glass of claim 7, wherein the glass comprises: from 65 mol % to 69 mol % $SiO_2$; from 5 mol % to 8 mol % $Al_2O_3$; from 19 mol % to 24 mol % $B_2O_3$; from 0 mol % to 2 mol % MgO; from 0 mol % to 3 mol % CaO; from 0 mol % to 4 mol % SrO; from 2 mol % to 7 mol % BaO; and from 0 mol % to 0.1 mol % of alkali metal oxide modifiers.

9. The glass of claim 1, wherein the Young's modulus is less than or equal to 58 GPa.

10. The glass of claim 1, wherein the glass has a coefficient of thermal expansion of less than or equal to $40 \times 10^{-7}/°$C.

11. The glass of claim 1, wherein the glass has a liquidus viscosity of at least 100 kpoise.

12. The glass of claim 11, wherein the glass is down-drawable.

13. The glass of claim 1, wherein the glass forms a clad layer laminated onto an outer surface of a core glass in a glass laminate, the core glass having a coefficient of thermal expansion that is greater than a coefficient of thermal expansion of the clad layer.

14. The glass of claim 13, wherein the clad layer is under a compressive stress of at least 100 MPa.

15. The glass of claim 1, wherein the glass forms at least a portion of a color filter substrate, a thin film transistor substrate, a cover glass for an electronic device, or a touch interface.

16. The glass of claim 1, comprising: from 64 mol % to 70 mol % $SiO_2$; from 4 mol % to 10 mol % $Al_2O_3$; from 18 mol % to 35 mol % $B_2O_3$; from 1 mol % to 8 mol % BaO; from 0 mol % to 4 mol % CaO; and from 0 mol % to 1 mol % of alkali metal oxide modifiers selected from the group consisting of $Li_2O$, $Na_2O$, and $K_2O$, wherein the glass has a density of 2.35 g/cm³ to 2.43 g/cm³ and a Young's modulus of less than or equal to 61 GPa.

17. The glass of claim 16, wherein the glass further comprises at least one fining agent, the fining agent comprising at least one of $SnO_2$, $CeO_2$, $As_2O_3$, $Sb_2O_5$, Cl⁻, and F⁻.

18. The glass of claim 16, wherein the glass comprises: from 0 mol % to 3 mol % MgO; from 0 mol % to 4 mol % CaO; from 0 mol % to 5 mol % SrO; and from 1 mol % to 8 mol % BaO.

19. The glass of claim 16, wherein the glass is substantially free of the alkali metal oxide modifiers.

20. The glass of claim 16, wherein the glass comprises: from 65 mol % to 69 mol % $SiO_2$; from 5 mol % to 8 mol % $Al_2O_3$; from 18 mol % to 24 mol % $B_2O_3$; from 0 mol % to 2 mol % MgO; from 0 mol % to 3 mol % CaO; from 0 mol % to 4 mol % SrO; from 2 mol % to 7 mol % BaO; and from 0 mol % to 0.1 mol % of the alkali metal oxide modifiers.

21. The glass of claim 16, wherein the coefficient of thermal expansion is less than or equal to $40 \times 10^{-7}/°$C.

22. The glass of claim 16, wherein the glass has a liquidus viscosity of at least 100 kpoise.

23. The glass of claim 22, wherein the glass is down-drawable.

24. The glass of claim 16, wherein the glass forms a clad layer laminated onto an outer surface of a core glass in a glass laminate, the core glass having a coefficient of thermal expansion that is greater than a coefficient of thermal expansion of the clad layer.

25. The glass of claim 24, wherein the clad layer is under a compressive stress of at least 100 MPa.

26. The glass of claim 16, wherein the glass forms at least a portion of a color filter substrate, a thin film transistor substrate, a cover glass, or a touch interface.

27. A glass laminate, the glass laminate comprising a core glass and a clad glass laminated onto an outer surface of the core glass, the clad glass layer comprising from 64 mol % to 70 mol % $SiO_2$; from 4 mol % to 10 mol % $Al_2O_3$; from 18 mol % to 35 mol % $B_2O_3$; from 1 mol % to 8 mol % BaO; from 0 mol % to 4 mol % CaO, and from 0 mol % to 1 mol % of alkali metal oxide modifiers selected from the group consisting of $Li_2O$, $Na_2O$, and $K_2O$, wherein the clad glass has a density of 2.35 g/cm³ to 2.43 g/cm³ and a Young's modulus of less than or equal to 61 GPa, and wherein the clad glass has a first coefficient of thermal expansion of less than or equal to $40 \times 10^{-7}/°$C. and the core glass has a second coefficient of thermal expansion that is greater than the first coefficient of thermal expansion.

28. The glass laminate of claim 27, wherein the clad glass further comprises at least one fining agent, the at least one fining agent comprising at least one of $SnO_2$, $CeO_2$, $As_2O_3$, $Sb_2O_5$, Cl⁻, and F⁻.

29. The glass laminate of claim 27, wherein the clad glass comprises: from 0 mol % to 3 mol % MgO; from 0 mol % to 4 mol % CaO; from 0 mol % to 5 mol % SrO; and from 1 mol % to 8 mol % BaO.

30. The glass laminate of claim 27 wherein the clad glass is substantially free of the alkali metal oxide modifiers.

31. The glass laminate of claim 27, wherein the clad glass comprises: from 65 mol % to 69 mol % $SiO_2$; from 5 mol % to 8 mol % $Al_2O_3$; from 18 mol % to 24 mol % $B_2O_3$; from 0 mol % to 2 mol % MgO; from 0 mol % to 3 mol % CaO; from 0 mol % to 4 mol % SrO; from 2 mol % to 7 mol % BaO; and from 0 mol % to 0.1 mol % of the alkali metal oxide modifiers.

32. The glass laminate of claim 27, wherein the core glass comprises an alkali aluminosilicate glass.

33. The glass laminate of claim 27, wherein the first coefficient of thermal expansion is less than or equal to $38 \times 10^{-7}/°$C.

34. The glass laminate of claim 27, wherein the clad glass has a liquidus viscosity of at least 100 kPoise.

35. The glass laminate of claim 27, wherein the clad glass is under a compressive stress of at least 40 MPa.

36. A method of making a glass laminate, the glass laminate comprising a core glass and a clad glass laminated onto an outer surface of the core glass, the method comprising:
   a. fusion-drawing a core glass melt to form the core glass; and
   b. down-drawing a clad glass melt to form the clad glass surrounding the core glass, wherein the core glass has a coefficient of thermal expansion that is greater than that of the clad glass, the clad glass comprising: from 64 mol % to 70 mol % $SiO_2$; at least 18 mol % $B_2O_3$; $Al_2O_3$; from 1 mol % to 8 mol % BaO; from 0 mol % to 4 mol % CaO; and from 0 mol % to 1 mol % of alkali metal oxide modifiers selected from the group consisting of $Li_2O$, $Na_2O$, and $K_2O$; and having a density of 2.35 g/cm³ to 2.43 g/cm³ and a Young's modulus of less than or equal to 61 GPa.

37. The method of claim 36, wherein down-drawing the glass melt comprises fusion-drawing the glass melt.

38. The method of claim 36, wherein the clad glass is substantially free of the alkali metal oxide modifiers.

39. The method of claim 36, wherein the clad glass comprises: from 64 mol % to 70 mol % $SiO_2$; from 4 mol % to 10 mol % $Al_2O_3$; from 18 mol % to 35 mol % $B_2O_3$; from 0 mol % to 3 mol % MgO; from 0 mol % to 4 mol % CaO; from 0 mol % to 5 mol % SrO; from 1 mol % to 8 mol % BaO; and from 0 mol % to 1 mol % of the alkali metal oxide modifiers.

40. The method of claim 39, wherein the clad glass comprises: from 65 mol % to 69 mol % $SiO_2$; from 5 mol % to 8 mol % $Al_2O_3$; from 18 mol % to 24 mol % $B_2O_3$;

from 0 mol % to 2 mol % MgO; from 0 mol % to 3 mol % CaO; from 0 mol % to 4 mol % SrO; from 2 mol % to 7 mol % BaO; and from 0 mol % to 0.1 mol % of the alkali metal oxide modifiers.

41. The method of claim 36, wherein the Young's modulus is less than or equal to 58 GPa.

42. The method of claim 37, wherein the clad glass has a liquidus viscosity of at least 100 kPoise.

43. The method of claim 36, wherein the coefficient of thermal expansion of the clad layer is less than or equal to $40 \times 10^{-7}/° C$.

44. The method of claim 43, wherein the coefficient of thermal expansion is less than or equal to $38 \times 10^{-7}/° C$.

45. The method of claim 36, wherein the clad glass is under a compressive stress of at least 100 MPa.

* * * * *

UNITED STATES PATENT AND TRADEMARK OFFICE
CERTIFICATE OF CORRECTION

PATENT NO. : 10,399,890 B2
APPLICATION NO. : 15/312965
DATED : September 3, 2019
INVENTOR(S) : John Christopher Mauro et al.

Page 1 of 1

It is certified that error appears in the above-identified patent and that said Letters Patent is hereby corrected as shown below:

On the Title Page

In Column 2, item (56), Foreign Patent Documents, Line 1, delete "4213679" and insert -- 4213579 --, therefor.

In the Claims

In Column 10, Line 2, Claim 27, delete "CaO," and insert -- CaO; --, therefor.

Signed and Sealed this
Tenth Day of March, 2020

Andrei Iancu
*Director of the United States Patent and Trademark Office*